US012077426B1

(12) United States Patent
Goodier et al.

(10) Patent No.: US 12,077,426 B1
(45) **Date of Patent: *Sep. 3, 2024**

(54) LIQUID DISCHARGE SYSTEM INCLUDING LIQUID PRODUCT PUMP HAVING VIBRATION SENSOR

(71) Applicant: PARAGON TANK TRUCK EQUIPMENT, LLC, Cartersville, GA (US)

(72) Inventors: Peter Charles Goodier, White, GA (US); Shawn R. Moore, Taylorsville, GA (US)

(73) Assignee: PARAGON TANK TRUCK EQUIPMENT, LLC, Cartersville, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/207,865

(22) Filed: Jun. 9, 2023

Related U.S. Application Data

(63) Continuation of application No. 16/928,676, filed on Jul. 14, 2020, now Pat. No. 11,713,237.

(51) Int. Cl.
*B67D 7/32* (2010.01)
*B67D 7/62* (2010.01)
*F04C 14/28* (2006.01)

(52) U.S. Cl.
CPC ............. *B67D 7/3272* (2013.01); *B67D 7/62* (2013.01); *F04C 14/28* (2013.01); *F04C 2270/12* (2013.01); *F04C 2270/86* (2013.01)

(58) Field of Classification Search
CPC .......... B67D 7/3272; B67D 7/62; B67D 7/66; F04C 14/28; F04C 2270/12;
(Continued)

(56) References Cited

U.S. PATENT DOCUMENTS 2,453,766 A * 11/1948 Thayer ...................... F17C 9/00 73/261
4,060,716 A * 11/1977 Pekrul ................ G05B 23/0283 376/217
(Continued)

OTHER PUBLICATIONS

Goulds Pumps; Goulds CV 3196 i-FRAME; Non-Clog Process Pump with i-ALERT Patented Intelligent Monitoring (Year: 2017).*
(Continued)

*Primary Examiner* — Devon C Kramer
*Assistant Examiner* — Benjamin Doyle
(74) *Attorney, Agent, or Firm* — CHRISTOPHER C. DREMANN, P.C.; Christopher C. Dremann

(57) ABSTRACT

A liquid discharge system includes a liquid product pump having a sensor for monitoring vibrations passing through an outer casing of the liquid product pump to detect an occurrence of cavitation within the liquid product pump. A system and method for controlling the operation of a liquid product pump in an engine-driven hydraulic discharge system. The liquid product pump has a vibration sensor operable to detect cavitation within the liquid product pump and for providing an electrical vibration signal to a speed control module. The speed control module is operable to process the vibration signal and to produce an electrical speed control signal that is provided to an electronic actuator. The electronic actuator is operable to actuate a motor control lever of a variable speed hydraulic motor to adjust the operating speed of the liquid product pump.

28 Claims, 8 Drawing Sheets

(58) Field of Classification Search
CPC ........ F04C 2270/86; F04C 2/10; F04C 2/344; F04C 2/126; F04C 2240/81; F01C 21/10
USPC ........................................................... 417/63
See application file for complete search history.

(56) References Cited

U.S. PATENT DOCUMENTS 4,191,270 A * 3/1980 Monteith ............... B62D 49/06 60/449
5,222,875 A * 6/1993 Clark ...................... F04B 15/08 417/370
5,332,356 A * 7/1994 Gulich .................. F04D 29/669 702/56
5,517,965 A * 5/1996 Notsu .................. F02D 9/1055 123/352
5,540,560 A * 7/1996 Kimura .................. G01P 3/488 417/63
5,630,625 A * 5/1997 Shaw .................... B60G 11/27 180/209
6,206,646 B1 * 3/2001 Bucher ................ F04D 29/669 417/63
6,330,525 B1 * 12/2001 Hays .................. F04D 15/0088 702/182
6,655,922 B1 * 12/2003 Flek ...................... F04D 29/669 73/1.37
6,663,349 B1 * 12/2003 Discenzo ............ F04D 15/0245 417/44.1
6,709,241 B2 * 3/2004 Sabini ................ F04D 15/0066 417/43
6,839,660 B2 * 1/2005 Eryurek ............ G05B 23/0229 702/65
6,853,951 B2 * 2/2005 Jarrell ................ G05B 23/0221 702/54
6,954,713 B2 * 10/2005 Eryurek ............ G05B 23/0243 702/140
7,053,498 B1 * 5/2006 Boisvert ................ F15B 21/08 290/40 C
7,539,549 B1 * 5/2009 Discenzo ................ G06N 3/08 702/183
9,010,481 B2 * 4/2015 Merth ..................... F04B 17/05 137/340
9,169,838 B2 * 10/2015 Kösters ................... F04C 19/00
10,134,257 B2 * 11/2018 Zhang ................... F04B 49/065
10,711,802 B2 * 7/2020 Hambe ................. F04D 29/445
11,203,988 B1 * 12/2021 Glugla ...................... F02D 9/08
2001/0013731 A1 * 8/2001 Shinohara .............. B60K 6/547 310/85
2001/0050167 A1 * 12/2001 Buysse ................. B60P 3/2245 165/279
2003/0162619 A1 * 8/2003 Rodeghiero ........... B60K 17/28 475/73
2006/0148607 A1 * 7/2006 Rodeghiero ........... B60K 17/28 475/83
2010/0037705 A1 * 2/2010 Wakamatsu .............. G01F 3/10 73/861.77
2010/0082275 A1 * 4/2010 Borsting ............. F04D 15/0066 702/56
2010/0097040 A1 * 4/2010 Boisvert ................. F15B 21/08 417/1
2010/0257853 A1 * 10/2010 Goodier .................. F16K 17/38 60/327
2010/0300683 A1 * 12/2010 Looper ................. E21B 47/008 166/250.01
2010/0307233 A1 * 12/2010 Glasson .................... F15B 1/08 73/168
2011/0133582 A1 * 6/2011 Bingler ................... F04D 13/08 310/71
2011/0241888 A1 * 10/2011 Lu ......................... F04D 29/669 340/626
2013/0259707 A1 * 10/2013 Yin ......................... F04B 49/06 417/63
2013/0325272 A1 * 12/2013 Beyer ................... F16H 61/462 701/54
2014/0026691 A1 * 1/2014 Huber ................... B60W 10/06 74/15.86
2014/0039805 A1 * 2/2014 Sharpe, Jr. ............ F04B 49/065 73/19.03
2014/0138165 A1 * 5/2014 Bebernes ............... B62D 11/04 180/6.3
2014/0144116 A1 * 5/2014 Kraus .................... A01D 41/14 56/10.2 H
2014/0148984 A1 * 5/2014 Nishi .................... B60W 20/10 180/65.265
2014/0150871 A1 * 6/2014 Goodier ................ B60P 3/2245 137/334
2015/0210151 A1 * 7/2015 Husson ................. B60W 20/00 903/903
2016/0046278 A1 * 2/2016 Matsuzaki ............ B60W 10/08 903/930
2017/0174481 A1 * 6/2017 Duray ...................... B66D 1/44
2017/0197621 A1 * 7/2017 Foster ............... B60W 30/1888
2018/0370355 A1 * 12/2018 Benevelli ............ F16H 61/4061
2019/0289771 A1 * 9/2019 Lang ...................... A01B 71/06
2019/0339162 A1 * 11/2019 Munk .................. G01N 29/036
2020/0040888 A1 * 2/2020 Zhang ...................... F04B 17/05
2020/0376713 A1 * 12/2020 Bertram ............ B29C 66/91213
2020/0388140 A1 * 12/2020 Gomez ................. F04B 49/065
2021/0291806 A1 * 9/2021 Forte ...................... B60K 6/365
2022/0017357 A1 * 1/2022 Goodier ..................... F04C 2/10
2022/0252473 A1 * 8/2022 Michiwaki ............ G01M 99/00

OTHER PUBLICATIONS

Pump Monitoring with Electronic Differential Pressure Transmitters; Vinay Nagendran, Endress+Hauser (Year: 2017).*

* cited by examiner

LIQUID DISCHARGE SYSTEM INCLUDING LIQUID PRODUCT PUMP HAVING VIBRATION SENSOR

FIELD OF THE INVENTION

The present invention relates generally to liquid discharge systems, and more particularly, to a liquid discharge system including a liquid product pump having a vibration sensor. The invention further relates to a system and method for controlling the operation of a liquid product pump in an engine-driven hydraulic discharge system. In an exemplary embodiment, the invention is a liquid discharge system including a vibration sensor for detecting cavitation within a liquid product pump, and a method for controlling the operating speed of the liquid product pump to avoid the potentially damaging effects of cavitation.

BACKGROUND OF THE INVENTION

A liquid discharge system is employed on a tank truck to off-load a liquid product from a tank trailer to a storage tank. The liquid discharge system typically includes a fluid pump, referred to herein as a liquid product pump, to transfer the liquid product from the tank trailer through a suction conduit and to the storage tank through a discharge conduit. The liquid product pump receives mechanical power from a variable speed hydraulic motor that in turn receives fluid pressure from a hydraulic pump powered by a constant speed power take-off (PTO) of the tank truck. The optimum operating speed of the liquid product pump for efficient off-loading of liquid product is determined primarily by the maximum speed at which the liquid product pump can operate before cavitation begins.

Cavitation can occur as a result of changes in operating temperature, but more commonly occurs as a result of changes in vacuum pressure at the inlet side of the liquid product pump. Excessive vacuum at the inlet side of the liquid product pump forms vapor bubbles in the liquid product that implode (collapse violently) when they reach the discharge side of the liquid product pump. The violent implosion of vapor bubbles releases heat energy that adds to the system heat and produces acoustic energy forces that cause pitting in the metal surfaces of the liquid product pump. Over time, cavitation will damage wear plates, gears and impeller vanes in addition to the outer casing of the liquid product pump. Eventually, if not avoided, cavitation will destroy the operation of the liquid product pump by causing erosion and/or seal failure.

Vacuum pressure at the inlet side of the liquid product pump is influenced by a number of factors, including the operating temperature, the ambient pressure, the density of the liquid product and the operating speed of the liquid product pump. The engine speed of the tank truck, and thus the power delivered by the power take-off (PTO) to the hydraulic pump, is constant. As a result, the liquid product pump operates at predetermined speed regardless of the density of the liquid product. The operator of a liquid discharge system can easily cause cavitation to occur within the liquid product pump by allowing the pump to operate in excess of the optimum operating speed for efficient off-loading. An untrained or inexperienced operator may not recognize an occurrence of cavitation. Even an experienced operator may not detect an occurrence of cavitation due to the noise in the ambient environment from the engine and power take-off (PTO) of the tank truck. As previously mentioned, repeated occurrences of cavitation over time will eventually destroy the operation of the liquid product pump by causing erosion and/or seal failure. Off-loading liquid product at the optimum operating speed of the liquid product pump is cost efficient. Conversely, downtime for repair or replacement of a liquid product pump in a liquid discharge system due to failure of the liquid product pump as a result of the damaging effects of cavitation is costly and inefficient.

U.S. Pat. No. 5,332,356 issued Jul. 26, 1994, to Gulich discloses a device and process for determining the erosion rate caused by cavitation in a liquid product pump by detecting the vibration in the pump casing. A noise measuring device secured to an outer wall of the pump casing or inserted a predetermined depth into the outer wall detects the vibrations of the outer wall to produce a casing vibration signal. The maximum local erosion rate is a known function of the fluid-borne noise level caused by cavitation. A signal processing unit of a computer processes the vibration signal by amplifying, filtering and/or digitizing the vibration signal and calculates a fluid-borne noise level. The computer then calculates a specific erosion rate from an empirical correlation with the fluid-borne noise level. A maximum local erosion rate is then determined from a known relationship between a material-dependent material constant and the specific erosion rate. The computer may indicate the accumulated erosion or may provide an alarm when a predetermined threshold of the maximum local erosion rate is exceeded.

Gulich further discloses the use of additional measuring devices including an outlet pressure measuring device and a suction (inlet) pressure measuring device that permit the computer to calculate the present flow rate of the pump, the operating point of the pump, and a reference pressure with a reference velocity of a rotating shaft of the pump. A regulating device controlled by the computer can control the operating speed of the motor of the pump. The closed control loop permits the flow rate of the pump to be determined independently of the erosion rate. Thus, the working point of the pump can be altered by adjusting the motor speed so that the pump operates to avoid cavitation.

U.S. Pat. No. 5,846,056 issued Dec. 8, 1998, to Dhindsa et al. discloses a method for operating a reciprocating pump. The reciprocating pump includes a control circuit and a vibration sensor affixed to the body of the reciprocating pump and electrically coupled to the control circuit. The vibration sensor provides signals representative of the vibration level of the pump to the control circuit. The control circuit processes the vibration sensor signals and activates an alarm in the event the vibration level of the pump exceeds a predetermined value. The control circuit may be programmed to reduce the operating speed of the pump in response to the vibration sensor signals indicating an excessive vibration of the pump, or alternatively, may shut down the pump until an improper installation or a malfunction of the pump is corrected.

U.S. Pat. No. 6,882,960 issued Apr. 19, 2005, to Miller discloses a system and a method for monitoring and analyzing the performance of a reciprocating piston positive displacement pump, commonly referred to as a "power pump." The system includes a signal processor electrically connected to pressure sensors and to various other sensors, including a fluid temperature sensor, a power input sensor, and a pump vibration sensor. The signal processor monitors the various sensors and analyzes the performance of the pump to determine pump efficiencies and operating parameters. The pump efficiencies and operating parameters may be displayed on a visual display directly connected to the signal processor or via an associated network.

SUMMARY OF THE INVENTION

In one aspect, the present invention is embodied by a liquid discharge system including a liquid product pump having an outer casing and a sensor operably coupled to the outer casing of the liquid product pump. The sensor monitors vibrations passing through the outer casing of the liquid product pump to detect an occurrence of cavitation within the liquid product pump. In one embodiment, the liquid product pump is a positive displacement pump. The positive displacement pump may be selected from the group consisting of a gear pump, a lobe pump, and a rotary vane pump. In one embodiment, the sensor is selected from the group consisting of an acoustic sensor, a knock sensor, and an accelerometer. In an advantageous embodiment, the sensor is a vibration sensor.

In one embodiment, the sensor is affixed to the exterior of the outer casing of the liquid product pump by a casing bolt that secures portions of the outer casing together. In another embodiment, the sensor is disposed at least partially within the outer casing.

In one embodiment, the liquid product pump has an intake connection configured for receiving a suction conduit and an outtake connection configured for receiving a discharge conduit. In an advantageous embodiment, the suction conduit extends between a tank trailer and the intake connection of the liquid product pump on a vacuum side of the liquid product pump and the discharge conduit extends between the outtake connection on a pressure side of the liquid product pump and a storage tank, and the liquid product pump operates to transfer a liquid product from the tank trailer to the storage tank.

In another aspect, the present invention is embodied by a system for controlling a liquid product pump in an engine-driven hydraulic discharge system. The system includes a hydraulic pump operably coupled to a power take-off (PTO) of a tank truck, a hydraulic motor operably coupled to the hydraulic pump to receive a fluid pressure produced by the hydraulic pump, and a liquid product pump operably coupled to the hydraulic motor to receive mechanical power produced by the hydraulic motor. The liquid product pump includes a sensor operably coupled to an outer casing of the liquid product pump. The sensor is operable for monitoring vibrations passing through the outer casing to detect an occurrence of cavitation within the liquid product pump and for providing an electrical vibration signal corresponding to a level of cavitation within the liquid product pump. The system further includes a speed control module in electrical communication with the sensor. The speed control module is operable for receiving the vibration signal provided by the sensor and for producing an electrical speed control signal corresponding to the vibration signal. The system further includes an electronic actuator in electrical communication with the speed control module. The electronic actuator is operable for receiving the speed control signal and for actuating the hydraulic motor to adjust an operating speed of the liquid product pump.

In one embodiment, the liquid product pump is selected from the group consisting of a gear pump, a lobe pump, and a rotary vane pump. In one embodiment, the sensor is selected from the group consisting of an acoustic sensor, a knock sensor, an accelerometer, and a vibration sensor. In one embodiment, the electronic actuator is selected from the group consisting of an electrically actuated ball valve and a linear actuator.

In another embodiment, the system further includes a pressure sensor disposed at a discharge side of the liquid product pump. The pressure sensor is operable for providing an electrical pressure signal to the speed control module corresponding to a flow rate of a liquid product through the liquid product pump.

In another aspect, the present invention is embodied by a method for controlling a liquid product pump in an engine-driven hydraulic discharge system. The method includes providing a liquid product pump having an outer casing and a sensor operably coupled to the outer casing. The method further includes operating the liquid product pump to transfer a liquid product from a tank trailer to a storage tank. The method further includes using the sensor to monitor vibrations through the outer casing of the liquid product pump to detect an occurrence of cavitation within the liquid product pump. The method further includes producing an electrical vibration signal corresponding to a level of cavitation detected within the liquid product pump. The method further includes providing the vibration signal to a speed control module to process an electrical speed control signal. The method further includes providing the speed control signal to an electronic actuator operable for adjusting the operating speed of the liquid product pump.

In one embodiment, the sensor is selected from the group consisting of an acoustic sensor, a knock sensor, an accelerometer, and a vibration sensor. In one embodiment, the liquid product pump is a positive displacement pump selected from the group consisting of a gear pump, a lobe pump, and a rotary vane pump.

In another embodiment, the method further includes using the electronic actuator to actuate a motor control lever of a variable speed hydraulic motor to adjust the operating speed of the liquid product pump. In yet another embodiment, the electronic actuator is selected from the group consisting of an electrically actuated ball valve and a linear actuator.

Additional aspects, objects, features, and advantages of the present invention will be made apparent or will be readily understood and appreciated by those skilled in the relevant art, as exemplary embodiments of the invention shown in the accompanying drawing figures are described in greater detail hereinafter. It is intended that all such aspects, objects, features, and advantages of the invention envisioned by this disclosure of exemplary embodiments be encompassed by the appended claims given their broadest reasonable interpretation consistent with this disclosure from the viewpoint of one of ordinary skill in the art. Consequently, the various terms used in this disclosure should be construed according to their ordinary and customary meaning to one of ordinary skill in the art at the time of this invention. The aspects, objects, features, and advantages of the invention, as well as others not expressly disclosed, may be accomplished by one or more of the exemplary embodiments described herein and illustrated in the accompanying drawing figures. However, it should be appreciated that the exemplary embodiments and drawing figures are merely illustrative of the invention and its various forms, and that many modifications, changes, revisions, and substitutions may be made to any of the exemplary embodiments without departing from the general concepts of the invention when broadly interpreted and properly construed.

BRIEF DESCRIPTION OF THE DRAWINGS

The aforementioned aspects, objects, features, and advantages of the present invention, as well as the exemplary embodiments of the invention, will be more fully understood and appreciated when considered in conjunction with the accompanying drawing figures, in which like reference characters designate the same or similar parts throughout the several views.

DETAILED DESCRIPTION OF EXEMPLARY EMBODIMENTS OF THE INVENTION

Figure 1:
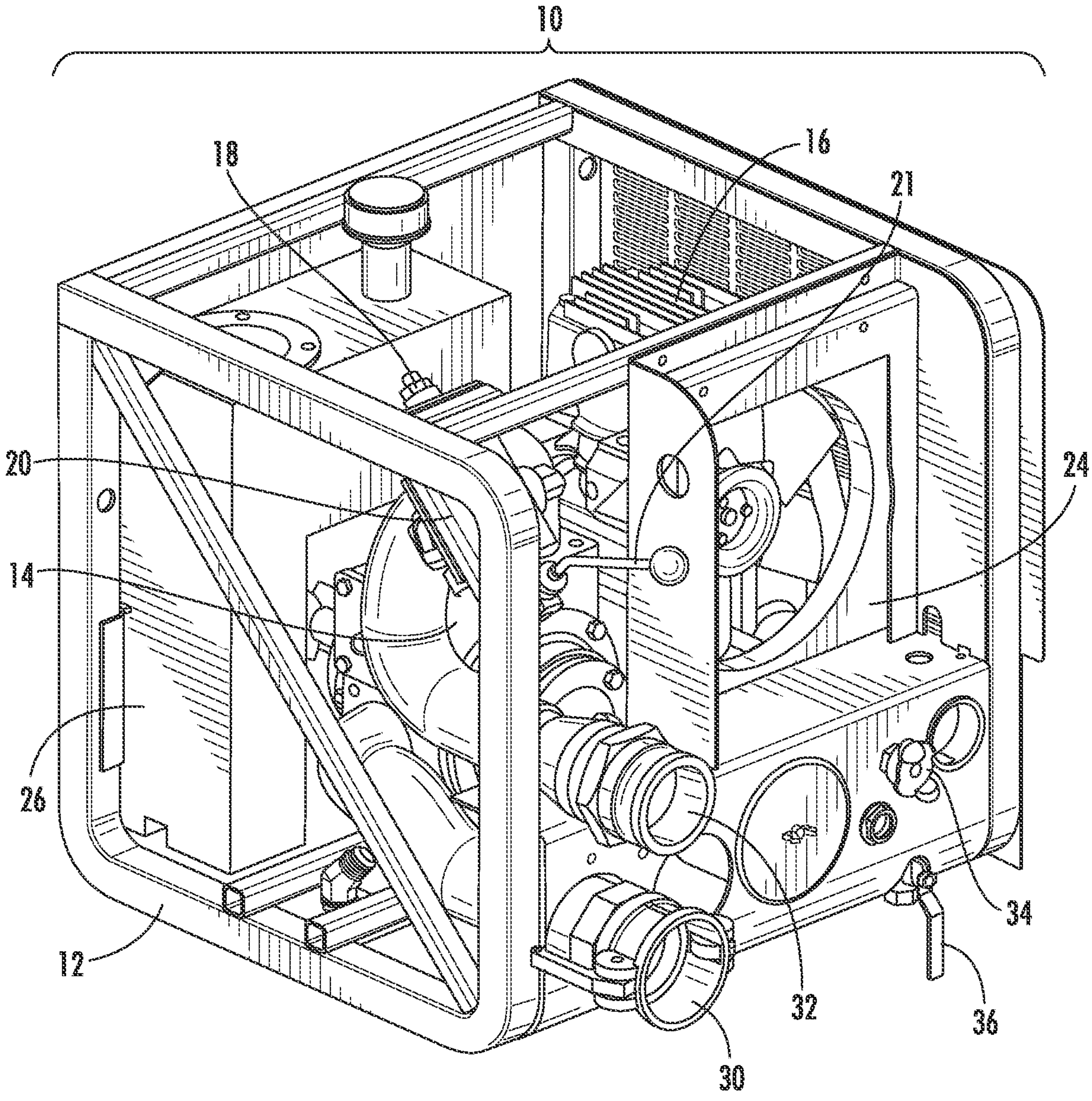
FIG. 1 is a front perspective view showing a liquid discharge system including a liquid product pump having a vibration sensor according to an exemplary embodiment of the present invention.
Figure 2:
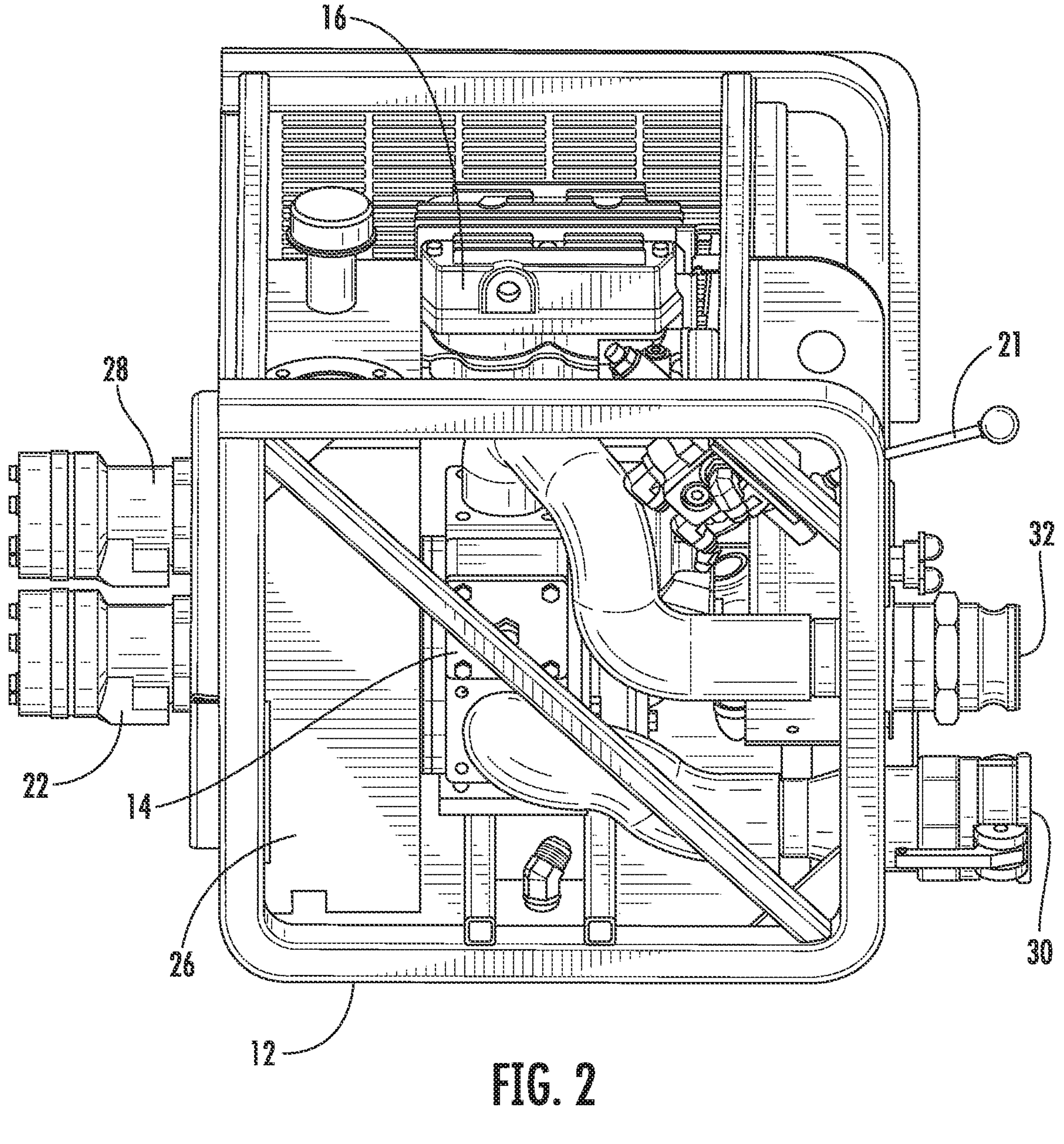
FIG. 2 is a left-hand side elevation view of the liquid discharge system of FIG. 1.
Figure 3:
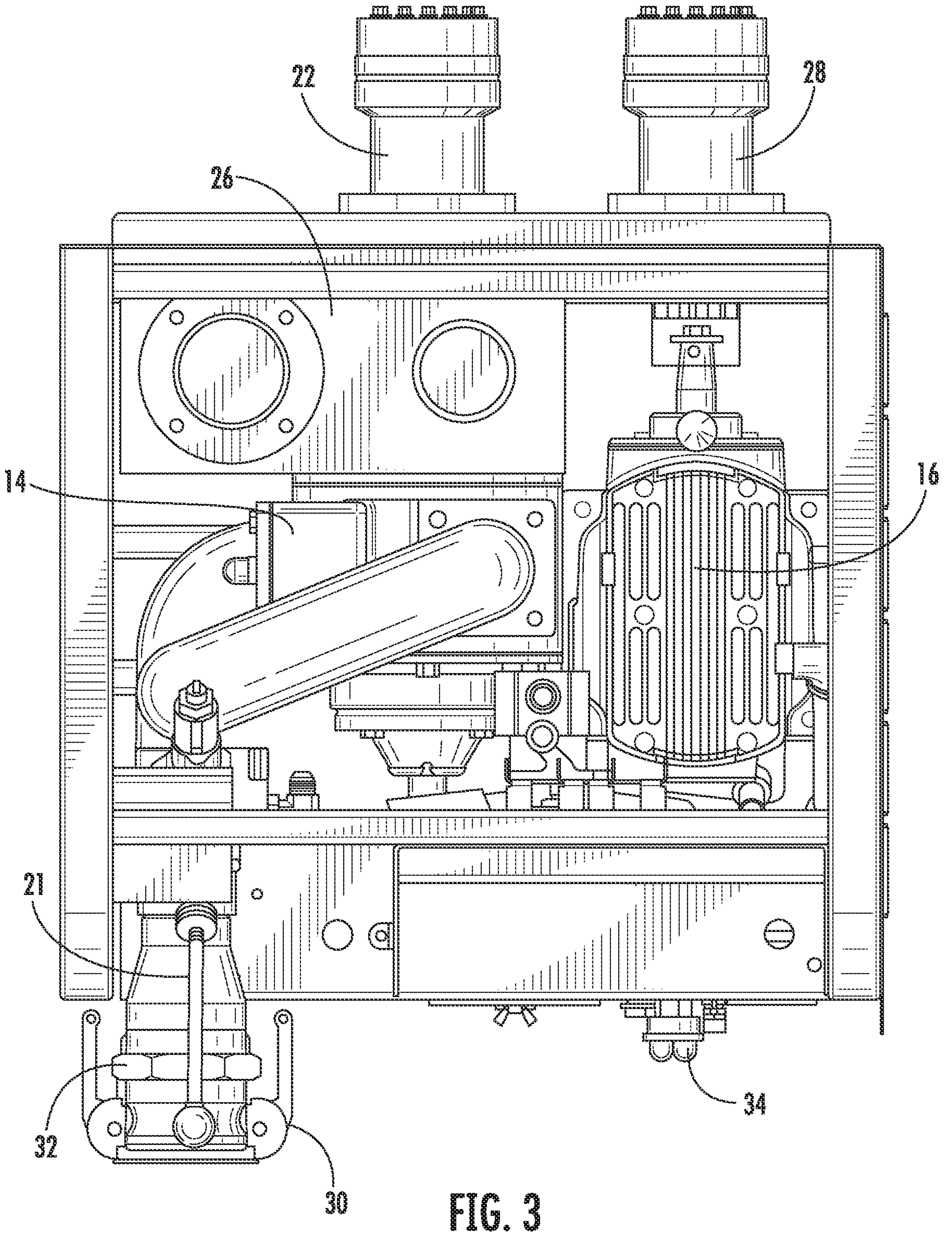
FIG. 3 is a top plan view of the liquid discharge system of FIG. 1.
Figure 4:
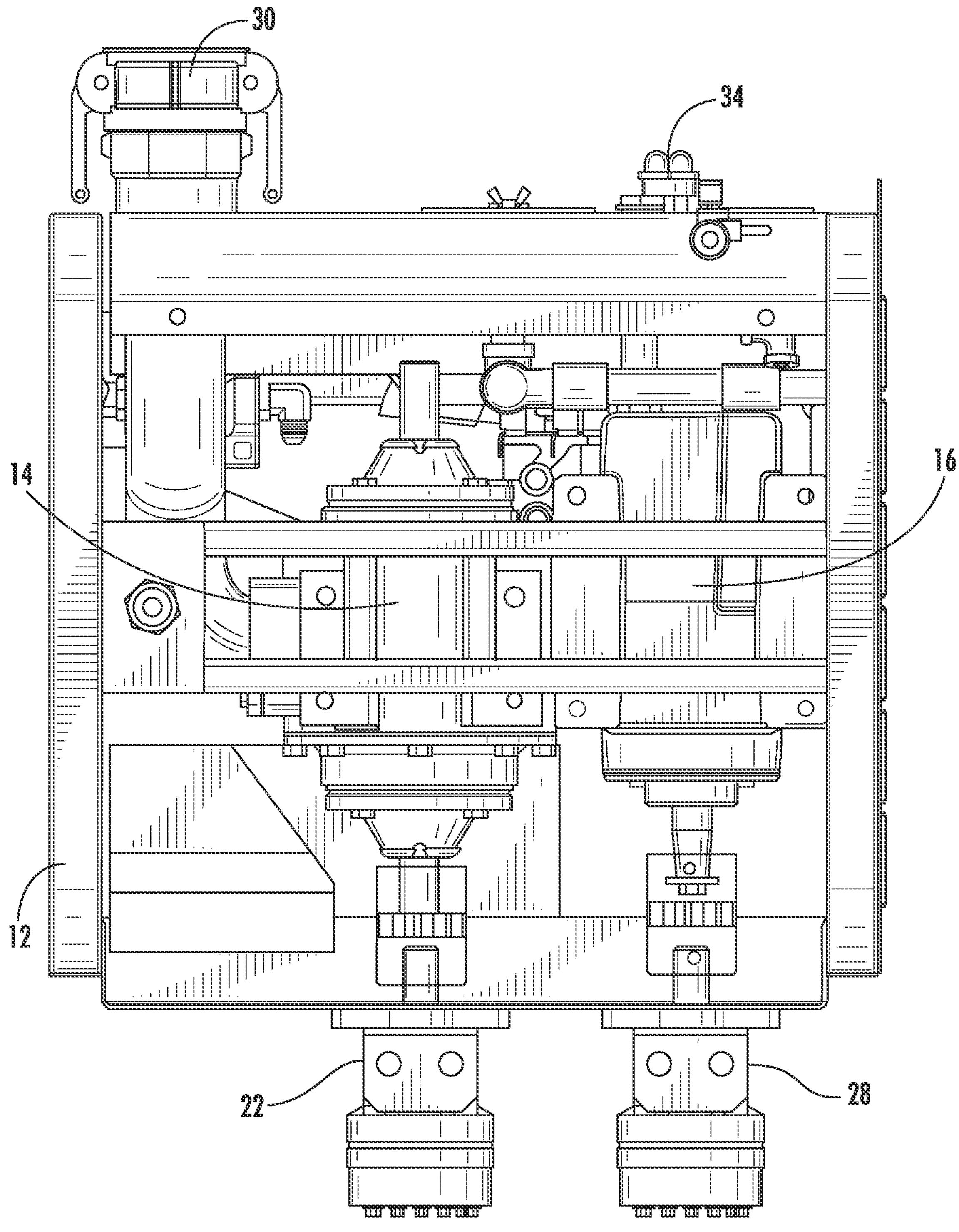
FIG. 4 is a bottom plan view of the liquid discharge system of FIG. 1.
Figure 5:
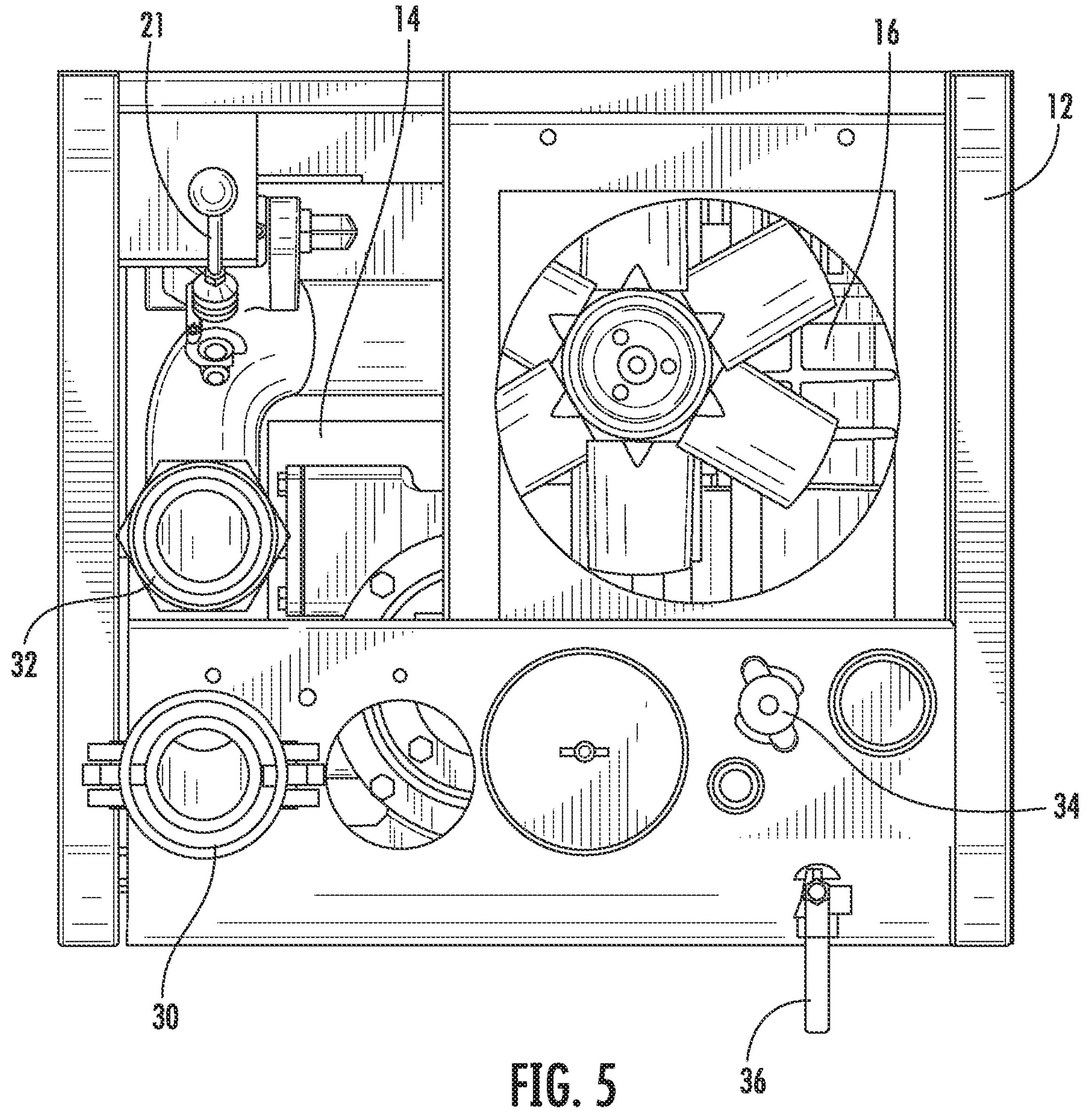
FIG. 5 is a front elevation view of the liquid discharge system of FIG. 1.

The following is a detailed description of exemplary embodiments of a liquid discharge system including a liquid product pump having a vibration sensor for detecting an occurrence of cavitation within the liquid product pump. A system and method for controlling the operation of a liquid product pump in an engine-driven hydraulic discharge system is shown and described in further exemplary embodiments of the present invention. A liquid discharge system is utilized to discharge or "off-load" a liquid product transported by a tank truck from a tank trailer into a storage tank. The liquid discharge system typically includes a liquid product pump for transferring the liquid product from the tank trailer to the storage tank. The liquid product pump, also referred to herein as a "fluid pump," "liquid pump" or "product pump," transfers the liquid product by creating a pressure differential between an inlet line, also referred to herein as a "suction" line, and an outlet line, also referred to herein as a "discharge" line. The liquid product pump may be powered by a constant speed power take-off (PTO) of an engine-driven hydraulic discharge system mounted on the tank truck.

Embodiments of the present invention are described more fully hereinafter with reference to the accompanying drawing figures. Exemplary embodiments show and describe a liquid discharge system including a liquid product pump having a vibration sensor for detecting an occurrence of cavitation within the liquid product pump. Other exemplary embodiments show and describe a system and method for controlling the operation, and more particularly the operating speed, of a liquid product pump in an engine-driven hydraulic discharge system. However, it is not intended for the present invention to be limited in any manner by the exemplary embodiments shown and described herein. Instead, it is expected that the present invention will be given the broadest reasonable interpretation and construction consistent with the disclosure as would be understood by one of ordinary skill in the art. Furthermore, unless another specific interpretation or construction is expressly provided, the exemplary embodiments illustrated herein and the various terms used herein should be given their ordinary and customary meanings as would be understood by a person of ordinary skill in the art at the time of the invention.

The present invention is broadly embodied by a liquid discharge system, indicated generally by reference character 10, as shown in FIGS. 1-5. By way of example and not limitation, the liquid discharge system 10 may be a hydraulic-driven liquid discharge system for off-loading liquid chemicals of the type available from Paragon Tank Truck Equipment, LLC of Cartersville, Georgia, USA, and commercially known as the HydraCHEM® liquid chemical off-loading system. The HydraCHEM® system 10 compiles and assembles hydraulic and pneumatic discharge equipment within a common enclosure 12 that is configured to be mounted onto a tank truck (not shown), for example onto a frame rail of the tank truck.

The liquid discharge system 10 off-loads liquid product from a tank trailer using either a hydraulic pump, referred to herein as a liquid product pump 14, or a pneumatic air compressor 16. Liquid product pump 14 may be any type of centrifugal or positive displacement pump suitable for off-loading a liquid product from a tank trailer to a storage tank using the liquid discharge system 10 of the tank truck. By way of example and not limitation, the liquid product pump 14 is a rotary, reciprocating or linear positive displacement pump. In a particularly advantageous embodiment, liquid product pump 14 is a positive displacement rotary pump selected from the group consisting of a gear pump, a lobe pump, and a rotary vane pump. Preferably, liquid discharge system 10 is powered by an external hydraulic pump operatively coupled to a conventional power take-off (PTO) of the tank truck. However, the present invention is not intended to be limited in any manner to a particular source of power for operating the liquid product pump 14 of the liquid discharge system 10. Conversely, it is envisioned that the liquid product pump 14 may be powered by any other suitable source of power, including by way of example and not limitation, by an electric motor and hydraulic pump, or alternatively, an auxiliary gasoline or diesel motor and hydraulic pump.

Regardless, hydraulic oil is pumped by the external hydraulic pump through a high-pressure fluid outtake line to a hydraulic fluid intake connection 18 provided on the liquid discharge system 10. The intake connection 18 is operatively coupled to a selection and/or direction valve 20 disposed within enclosure 12 so that the selection and/or direction valve 20 is in fluid communication with the external hydraulic pump. In turn, the selection and/or direction valve 20 is in fluid communication with a hydraulic motor 22 (FIGS. 2-4) disposed within enclosure 12 that drives the liquid product pump 14. A hydraulic oil cooler 24 disposed within the enclosure 12 is in fluid communication with a hydraulic oil tank 26 likewise disposed within the enclosure 12. The hydraulic oil tank 26 is in fluid communication with the external hydraulic pump through an outtake connection that is preferably located on the underside of the hydraulic oil tank 26.

Another hydraulic motor 28 (FIGS. 2-4) disposed within enclosure 12 for driving the air compressor 16 is operatively coupled to the selection and/or direction valve 20, for example through a "tee" valve (not shown). The hydraulic motor 22 that drives the liquid product pump 14 is likewise operatively coupled to the selection and/or direction valve 20 through the same "tee" valve. Both the hydraulic motor 22 that drives the liquid product pump 14 and the hydraulic motor 28 that drives the air compressor 16 are provided with hydraulic oil return (outtake) lines so that the hydraulic motors 22, 28 are in fluid communication with the hydraulic oil cooler 24.

The liquid product pump 14 has a liquid intake connection 30, such as a conventional liquid coupling, that is configured to receive a free end of a first liquid conduit (not shown) extending between a liquid discharge connection provided on the tank trailer and a vacuum side of the liquid product pump 14. The liquid product pump 14 further has a liquid outtake connection 32, such as a conventional liquid coupling, that is configured to receive a free end of a second liquid conduit (not shown) extending between a pressure side of the liquid product pump 14 and a liquid intake connection provided on a storage tank. Thus, liquid product pump 14 operates to off-load the liquid product from the tank trailer by suctioning the liquid product through the first liquid conduit and discharging the liquid product into the storage tank through the second liquid conduit. Similarly, the air compressor 16 has a pneumatic outtake connection 34 that is configured to receive a free end of a pneumatic line (not shown) extending between the air compressor 16 and a pneumatic intake connection provided on the tank trailer. A movable lever 36 provided on the outside of the enclosure 12 of the liquid discharge system 10 operates to open a valve (not shown) to deliver compressed air through the pneumatic line to the tank trailer, and to close the valve to prevent compressed air from being delivered to the tank trailer.

As shown herein, the selection and/or direction valve 20 is provided with an actuator handle 21 that extends outwardly from the enclosure 12 for permitting an operator to select the operation of the liquid discharge system 10 between the liquid product pump 14 and the air compressor 16. By way of example and not limitation, the operator may select the liquid product pump 14 of the liquid discharge system 10 to off-load liquids that will not cause damage to the liquid product pump 14. Conversely, the operator may select the air compressor 16 of the liquid discharge system 10 to off-load liquids that could potentially cause damage to the liquid product pump 14. In addition, the actuator handle 21 of the selection and/or direction valve 20 may be configured to allow the operator to manually adjust the operating speed of the liquid product pump 14, for example to off-load a liquid that is sensitive to a shear force, and/or to select the flow direction of a bi-directional liquid product pump 14.

Figure 6:
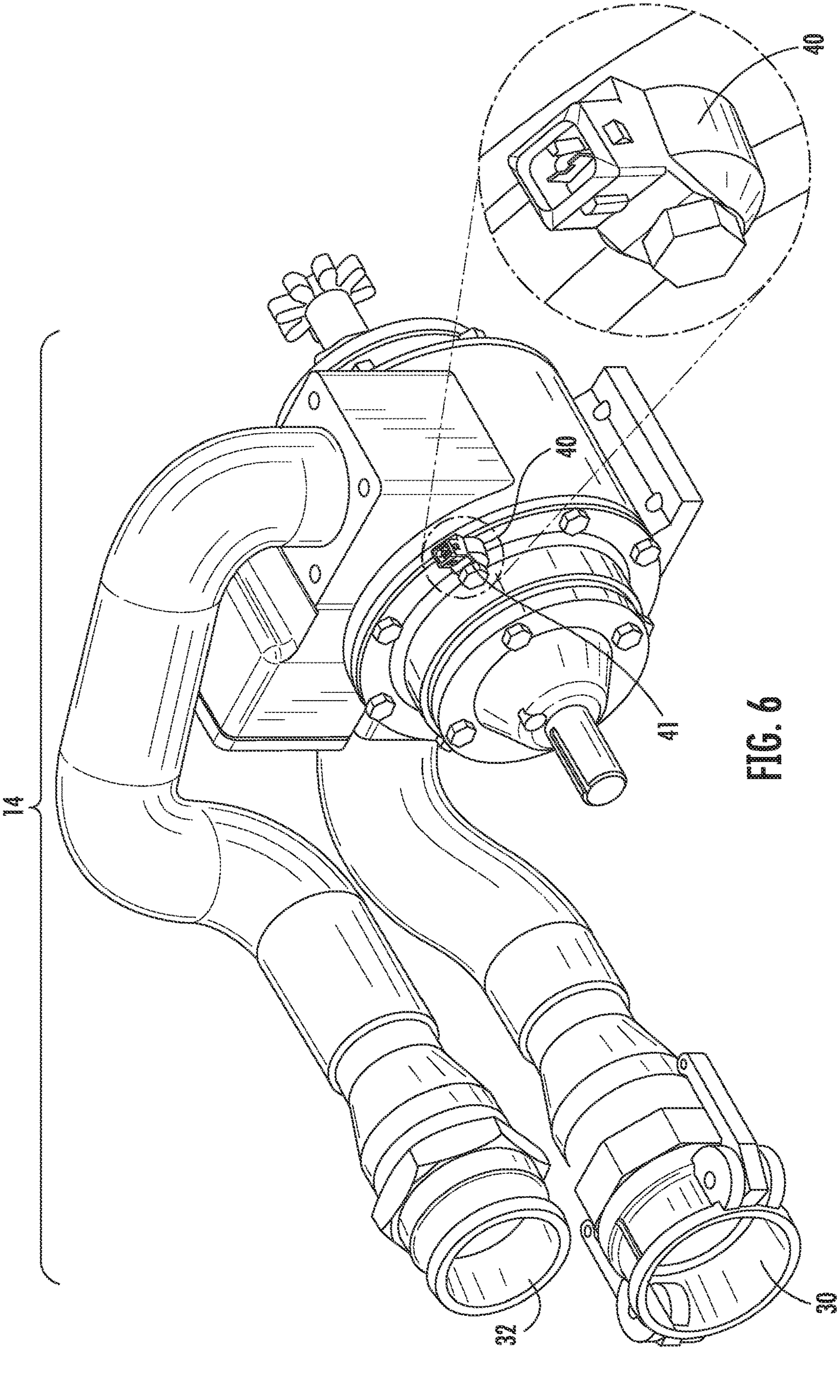
FIG. 6 is a perspective view showing an exemplary embodiment of a liquid product pump according to the present invention.

FIG. 6 shows an exemplary embodiment of a liquid product pump 14 according to the present invention. As shown herein, the liquid product pump 14 of the liquid discharge system 10 is a positive displacement rotary gear pump having a sensor 40 for detecting the occurrence of cavitation within the liquid product pump 14. The sensor 40 may be any type of mechanical or electrical sensor suitable for detecting a level of cavitation within the liquid product pump 14 and for converting a measurement of the level of cavitation to a corresponding electrical vibration signal. By way of example and not limitation, the sensor 40 may be an acoustic sensor, a "knock" sensor, or an accelerometer. In a particularly advantageous embodiment, the sensor 40 is a vibration sensor that is operatively coupled to the liquid product pump 14.

The vibration sensor 40 may be provided at any suitable location on the liquid product pump 14. Preferably, however, the vibration sensor 40 is disposed on an outer casing 42 of the liquid product pump 14, or alternatively, is only partially disposed within the outer casing 42. In this manner, sensor 40 will not be subjected to damage or malfunction as a result of exposure to the flow of the liquid product through the liquid product pump 14, or to the cavitation forces that may occur within the liquid product pump 14. In a particularly advantageous embodiment, the sensor 40 is installed onto the exterior of the outer casing 42 of the liquid product pump 14 through a casing bolt 41 that secures separable portions of the outer casing 42 together. Regardless, the sensor 40 monitors vibrations through the outer casing 42 of the liquid product pump 14 to detect cavitation that occurs within the liquid product pump 14. In the event the vibrations indicate an occurrence of excessive cavitation, an operator can manually adjust the operating speed of the liquid product pump 14 and/or other operating parameters of the liquid discharge system 10 to eliminate or reduce the potentially damaging effects of the cavitation.

Figure 7:
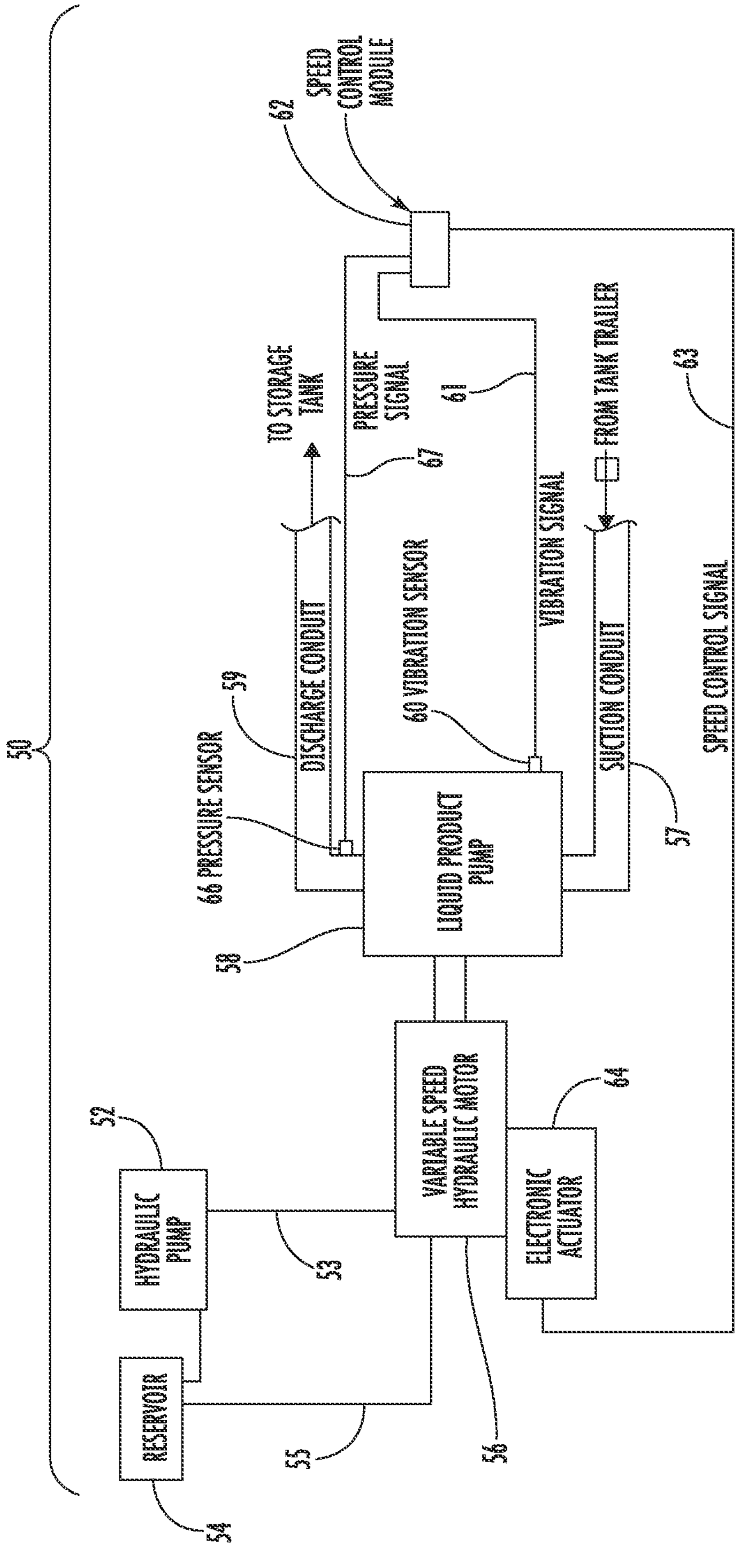
FIG. 7 is a schematic diagram showing a system for controlling the operation of a liquid product pump in an engine-driven hydraulic discharge system according to an exemplary embodiment of the present invention.

An exemplary embodiment of a system 50 for controlling the operation of a liquid product pump in an engine-driven hydraulic discharge system is shown in FIG. 7. System 50 comprises a hydraulic pump 52 that is driven by a constant speed power take-off (PTO) of a tank truck. The hydraulic pump 52 is in fluid communication with a hydraulic oil reservoir 54 via a hydraulic oil supply line 53 to supply a hydraulic fluid pressure to a variable speed hydraulic motor 56. The hydraulic motor 56 in turn is in fluid communication with the hydraulic oil reservoir via a hydraulic oil return line 55. The hydraulic motor 56 provides mechanical power to operate a liquid product pump 58, also referred to herein as a "liquid pump," "fluid pump" or "product pump." In an advantageous embodiment, the liquid product pump 58 is a positive displacement rotary pump, such as a gear pump, a lobe pump, or a rotary vane pump, and the hydraulic motor 56 provides mechanical power to the liquid product pump 58 via a rotating shaft. The liquid product pump 58 has an intake connection for receiving a liquid product inlet conduit 57, commonly referred to as a "suction" conduit, extending between the tank trailer and a vacuum side of the liquid product pump 58. The liquid product pump 58 further has an outtake connection for receiving a liquid product outlet conduit 59, commonly referred to as a "discharge" conduit, at a pressure side of the liquid product pump 58. The liquid product pump 58 operates in a well-known manner to transfer liquid product from a tank trailer of the tank truck through the suction conduit 57 to a storage tank through the discharge conduit 59.

The liquid product pump 58 further has a sensor 60 for detecting an occurrence of cavitation within the liquid product pump 58. The sensor 60 monitors acoustic noise in the form of vibrations through the outer casing of the liquid product pump 58 that indicates an occurrence of cavitation within the liquid product pump 58. Preferably, the sensor 60 is a vibration sensor selected from the group consisting of an acoustic sensor, a "knock" sensor, and an accelerometer. The sensor 60 produces an electrical vibration signal 61 corresponding to a measurement of the vibrations through the outer casing of the liquid product pump 58, and consequently, the level of cavitation detected within the liquid product pump 58. Sensor 60 is operatively coupled to a speed control module 62 and provides the vibration signal 61 corresponding to the measurement of the vibrations to the speed control module 62. The speed control module 62 in turn processes a speed control signal 63 in response to the occurrence of cavitation detected within the liquid product pump 58. Speed control module 62 provides the speed control signal 63 to an electronic actuator 64 that is operatively coupled to the speed control module 62. The electronic actuator 64 in turn is operatively coupled to the variable speed hydraulic motor 56. The electronic actuator 64 operates to actuate a motor control lever of the variable speed hydraulic motor 56 to adjust the operation, and more specifically, the operating speed of the liquid product pump 58. Electronic actuator 64 may be any type of actuator suitable for automatically repositioning the motor control lever of the variable speed hydraulic motor 56. By way of example and not limitation, the electronic actuator 64 may be an electrically actuated ball valve, a linear actuator, or the like.

System 50 for controlling the operation of the liquid product pump 58 in the engine-driven hydraulic discharge system may further comprise a pressure sensor 66 disposed at the discharge side of the liquid product pump 58. For example, the pressure sensor 66 may be located within the discharge conduit 59 adjacent to the outer casing of the liquid product pump 58 at the outlet of the liquid product pump 58, as depicted in FIG. 7. Regardless, pressure sensor 66 measures the flow rate of the liquid product entering the discharge conduit 59 and provides an electrical pressure signal 67 corresponding to the flow rate to the speed control module 62 in substantially the same manner as the vibration sensor 60 provides the vibration signal 61. Ambient air will sometimes enter suction conduit 57 near the end of a discharge operation when only a relatively small quantity of liquid product remains in the tank trailer. This low-pressure situation can cause vibrations in the liquid product pump 58 that the vibration sensor 60 is unable to differentiate between vibrations resulting from cavitation within the liquid product pump 58. Thus, near the end of the discharge operation the vibration sensor 60 provides a vibration signal 61 to the speed control module 62 that starts to slow the operating speed of the liquid product pump 58. The pressure signal 67 from the pressure sensor 66 operates to override the vibration signal 61 by causing the speed control module 62 to ignore the vibration signal 61 in a low-pressure situation at the outlet of the liquid product pump 58 entering the discharge conduit 59. The pressure sensor 66 and the pressure signal 67 may also operate to control a high-pressure situation, for example by causing the speed control module 62 to shut down the operation of the liquid product pump 58.

Figure 8:
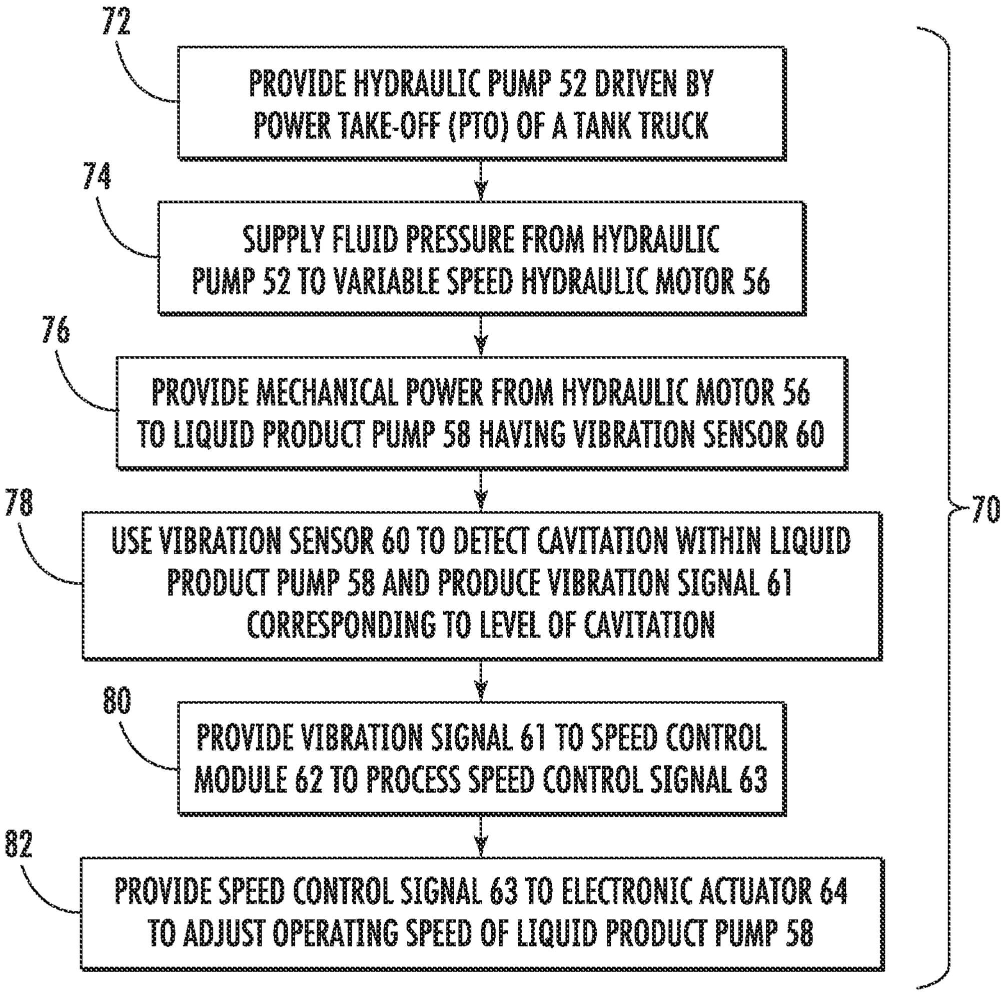
FIG. 8 is a flowchart illustrating a method for controlling the operation of the liquid product pump in the engine-driven hydraulic discharge system of FIG. 7 according to an exemplary embodiment of the present invention.

Regardless, the operation of the liquid product pump 58 can be controlled in an engine-driven hydraulic discharge system by a method 70 according to the invention shown in FIG. 8. In a first step 72, a hydraulic pump 52 driven by a constant speed power take-off (PTO) of a tank truck is provided. In a second step 74, the hydraulic pump 52 supplies a fluid pressure to a variable speed hydraulic motor 56. In a third step 76, the hydraulic motor 56 provides mechanical power to a liquid product pump 58 having a vibration sensor 60. In a fourth step 78, the vibration sensor 60 measures vibrations through an outer casing of the liquid product pump 58 to detect cavitation within the liquid product pump 58 and produces an electrical vibration signal 61 corresponding to the level of cavitation detected within the liquid product pump 58. The vibration signal 61 is provided to a speed control module 62 in a fifth step 80 to process an electrical speed control signal 63. In a sixth step 82, the speed control signal 63 is provided to an electronic actuator 64 that actuates a motor control lever of the hydraulic motor 56 to adjust the operating speed of the liquid product pump 58. As discussed above, a pressure signal 67 produced by an optional pressure sensor 66 may also be provided to the speed control module 62 to cause the vibration signal 61 to be ignored in a low-pressure situation, for example if ambient air enters the suction conduit 57 near the end of a discharge operation when only a relatively small quantity of liquid product remains in the tank trailer.

The liquid discharge system 10 including a liquid product pump 14 having a vibration sensor 40 shown and described herein operates to automatically adjust the operating speed of the liquid product pump 14. The system 50 and method 70 for controlling the operating speed of a liquid product pump 58 having a vibration sensor 60 in an engine-driven hydraulic discharge system similarly operates to automatically adjust the operating speed of the liquid product pump 58. Controlling the operating speed of the liquid product pump 14, 58 serves to avoid an occurrence of cavitation that can potentially damage the liquid product pump and/or the liquid product being transferred from the tank trailer to the storage tank. Automatically adjusting the operating speed of the liquid product pump 14, 58 removes the responsibility of monitoring the discharge operation for cavitation within the liquid product pump 14, 58 from an undertrained and/or inexperienced operator that may not recognize an occurrence of cavitation, or that may be unable to discern an occurrence of cavitation given the noise level in the ambient environment from the engine and power take-off (PTO) of the tank truck.

Regardless of the foregoing detailed description of exemplary embodiments of the invention, the optimum configuration of the article of manufacture, apparatus, device or system, and the manner of use, operation, and steps of the associated methods, as well as reasonable equivalents thereof, are deemed to be readily apparent and understood by those skilled in the art. Accordingly, equivalent relationships to those shown in the accompanying drawing figures and described in the written description are intended to be encompassed by the present invention given the broadest reasonable interpretation and construction of the appended claims, the foregoing written description and the drawing figures being considered as merely illustrative of the general concepts and principles of the invention. Furthermore, as numerous modifications and changes will readily occur to those skilled in the art, the invention is not intended to be limited to the specific configuration, construction, materials, manner of use and operation of the exemplary embodiments shown and described herein. Instead, all reasonably predictable and suitable equivalents and obvious modifications to the invention should be construed as falling within the scope of the invention as defined by the appended claims given their broadest reasonable interpretation and construction to one of ordinary skill in the art within the context of the foregoing written description and accompanying drawing figures.

That which is claimed is:

1. A liquid discharge system for a tank truck, comprising:

a hydraulic pump operably coupled to a power take-off (PTO) from the tank truck;

an enclosure containing a liquid product pump and a first hydraulic motor operably coupled to the hydraulic pump for providing mechanical power to the liquid product pump, the enclosure further containing an air compressor and a second hydraulic motor operably coupled to the hydraulic pump for driving the air compressor;

a selection valve in fluid communication with the hydraulic pump, the selection valve operably coupled to the liquid product pump and the air compressor, the selection valve operable to select one of the liquid product pump and the air compressor for discharging a liquid product from a tank trailer of the tank truck;

a vibration sensor operably coupled to the liquid product pump for monitoring vibration within the liquid product pump and producing a vibration signal corresponding to a level of cavitation within the liquid product pump;

a speed control module that actuates the first hydraulic motor to adjust an operating speed of the liquid product pump in response to the vibration signal corresponding to the level of cavitation within the liquid product pump; and a pressure sensor for measuring a flow rate and for producing a pressure signal corresponding to the flow rate through the liquid product pump;

wherein the pressure signal produced by the pressure sensor operates to override the vibration signal produced by the vibration sensor and cause the speed control module to ignore the vibration signal produced by the vibration sensor that actuates the first hydraulic motor to adjust the operating speed of the liquid product pump.

2. The liquid discharge system of claim 1, wherein at least one of the first hydraulic motor and the second hydraulic motor is a variable speed hydraulic motor.

3. The liquid discharge system of claim 1, wherein the tank truck comprises an engine that operates at a constant speed such that the power take-off (PTO) of the tank truck produces a constant power, and wherein the first hydraulic motor is a variable speed hydraulic motor.

4. The liquid discharge system of claim 1, wherein the selection valve comprises a valve operable to select the liquid product pump for discharging a liquid product from the tank trailer of the tank truck that does not cause cavitation within the liquid product pump.

5. The liquid discharge system of claim 1, wherein the selection valve comprises a valve operable to select the air compressor for discharging a liquid product from the tank trailer of the tank truck that causes cavitation within the liquid product pump.

6. The liquid discharge system of claim 1, wherein the vibration sensor is disposed adjacent a vacuum side of the liquid product pump and the pressure sensor is disposed adjacent a pressure side of the liquid product pump.

7. The liquid discharge system of claim 1, wherein the liquid product pump is a positive displacement pump selected from the group consisting of a gear pump, a lobe pump, and a rotary vane pump.

8. The liquid discharge system of claim 1, wherein the vibration sensor is selected from the group consisting of an acoustic sensor, a knock sensor, and an accelerometer.

9. The liquid discharge system of claim 1, wherein the liquid product pump has an intake connection configured for receiving a suction conduit and an outtake connection configured for receiving a discharge conduit, and wherein the suction conduit extends between the tank trailer of the tank truck and the intake connection of the liquid product pump on a vacuum side of the liquid product pump and the discharge conduit extends between the outtake connection on a pressure side of the liquid product pump and a storage tank, and wherein the liquid product pump operates to transfer a liquid product from the tank trailer of the tank truck to the storage tank.

10. A hydraulic discharge system for discharging a liquid product from a tank trailer of a tank truck, comprising:

a hydraulic pump operably coupled to a power take-off (PTO) from the tank truck;

a first hydraulic motor operably coupled to the hydraulic pump to receive fluid pressure produced by the hydraulic pump;

a liquid product pump operably coupled to the first hydraulic motor to receive mechanical power produced by the first hydraulic motor;

a vibration sensor operably coupled to the liquid product pump and operable for monitoring vibrations within the liquid product pump and for producing a vibration signal corresponding to a level of cavitation within the liquid product pump;

a speed control module operably coupled to the vibration sensor and operable for receiving the vibration signal produced by the vibration sensor and for producing a speed control signal corresponding to the vibration signal;

an actuator operably coupled to the speed control module and operable for receiving the speed control signal and for actuating the first hydraulic motor to adjust an operating speed of the liquid product pump;

a second hydraulic motor operably coupled to the hydraulic pump to receive fluid pressure produced by the hydraulic pump;

an air compressor operably coupled to the second hydraulic motor to receive mechanical power produced by the first hydraulic motor;

a selection valve in fluid communication with the hydraulic pump and operable to select one of the liquid product pump and the air compressor to discharge the liquid product from the tank trailer of the tank truck; and a pressure sensor for measuring a flow rate and for producing a pressure signal corresponding to the flow rate through the liquid product pump;

wherein the pressure signal produced by the pressure sensor operates to override the vibration signal produced by the vibration sensor and cause the speed control module to ignore the vibration signal produced by the vibration sensor that actuates the first hydraulic motor to adjust the operating speed of the liquid product pump.

11. The hydraulic discharge system of claim 10, wherein at least one of the first hydraulic motor and the second hydraulic motor is a variable speed hydraulic motor.

12. The hydraulic discharge system of claim 10, wherein the selection valve comprises a valve operable to select the liquid product pump for discharging a liquid product from the tank trailer of the tank truck that does not cause cavitation within the liquid product pump.

13. The hydraulic discharge system of claim 10, wherein the selection valve comprises a valve operable to select the air compressor for discharging a liquid product from the tank trailer of the tank truck that causes cavitation within the liquid product pump.

14. The hydraulic discharge system of claim 10, wherein the vibration sensor is disposed adjacent a vacuum side of the liquid product pump and the pressure sensor is disposed adjacent a pressure side of the liquid product pump.

15. A liquid discharge system for a tank truck, comprising:

a hydraulic pump operably coupled to a power take-off (PTO) from the tank truck;

an enclosure containing a liquid product pump and a first hydraulic motor operably coupled to the hydraulic pump for providing mechanical power to the liquid product pump, the enclosure further containing an air compressor and a second hydraulic motor operably coupled to the hydraulic pump for driving the air compressor;

a selection valve in fluid communication with the hydraulic pump, the selection valve operably coupled to the liquid product pump and the air compressor, the selection valve operable to select one of the liquid product pump and the air compressor for discharging a liquid product from a tank trailer of the tank truck;

a vibration sensor operably coupled to the liquid product pump for monitoring vibration within the liquid product pump and producing a vibration signal corresponding to a level of cavitation within the liquid product pump;

a speed control module that actuates the first hydraulic motor to adjust an operating speed of the liquid product pump in response to the vibration signal corresponding to the level of cavitation within the liquid product pump; and a pressure sensor for measuring a flow rate and for producing a pressure signal corresponding to the flow rate through the liquid product pump;

wherein the pressure signal produced by the pressure sensor operates to override the vibration signal produced by the vibration sensor and cause the speed control module that actuates the first hydraulic motor to adjust the operating speed of the liquid product pump to shut down.

16. The liquid discharge system of claim 15, wherein at least one of the first hydraulic motor and the second hydraulic motor is a variable speed hydraulic motor.

17. The liquid discharge system of claim 15, wherein the tank truck comprises an engine that operates at a constant speed such that the power take-off (PTO) of the tank truck produces a constant power, and wherein the first hydraulic motor is a variable speed hydraulic motor.

18. The liquid discharge system of claim 15, wherein the selection valve comprises a valve operable to select the liquid product pump for discharging a liquid product from the tank trailer of the tank truck that does not cause cavitation within the liquid product pump.

19. The liquid discharge system of claim 15, wherein the selection valve comprises a valve operable to select the air compressor for discharging a liquid product from the tank trailer of the tank truck that causes cavitation within the liquid product pump.

20. The liquid discharge system of claim 15, wherein the vibration sensor is disposed adjacent a vacuum side of the liquid product pump and the pressure sensor is disposed adjacent a pressure side of the liquid product pump.

21. The liquid discharge system of claim 15, wherein the liquid product pump is a positive displacement pump selected from the group consisting of a gear pump, a lobe pump, and a rotary vane pump.

22. The liquid discharge system of claim 15, wherein the vibration sensor is selected from the group consisting of an acoustic sensor, a knock sensor, and an accelerometer.

23. The liquid discharge system of claim 15, wherein the liquid product pump has an intake connection configured for receiving a suction conduit and an outtake connection configured for receiving a discharge conduit, and wherein the suction conduit extends between the tank trailer of the tank truck and the intake connection of the liquid product pump on a vacuum side of the liquid product pump and the discharge conduit extends between the outtake connection on a pressure side of the liquid product pump and a storage tank, and wherein the liquid product pump operates to transfer a liquid product from the tank trailer of the tank truck to the storage tank.

24. A hydraulic discharge system for discharging a liquid product from a tank trailer of a tank truck, comprising:

a hydraulic pump operably coupled to a power take-off (PTO) from the tank truck;

a first hydraulic motor operably coupled to the hydraulic pump to receive fluid pressure produced by the hydraulic pump;

a liquid product pump operably coupled to the first hydraulic motor to receive mechanical power produced by the first hydraulic motor;

a vibration sensor operably coupled to the liquid product pump and operable for monitoring vibrations within the liquid product pump and for producing a vibration signal corresponding to a level of cavitation within the liquid product pump;

a speed control module operably coupled to the vibration sensor and operable for receiving the vibration signal produced by the vibration sensor and for producing a speed control signal corresponding to the vibration signal;

an actuator operably coupled to the speed control module and operable for receiving the speed control signal and for actuating the first hydraulic motor to adjust an operating speed of the liquid product pump;

a second hydraulic motor operably coupled to the hydraulic pump to receive fluid pressure produced by the hydraulic pump;

an air compressor operably coupled to the second hydraulic motor to receive mechanical power produced by the first hydraulic motor;

a selection valve in fluid communication with the hydraulic pump and operable to select one of the liquid product pump and the air compressor to discharge the liquid product from the tank trailer of the tank truck; and a pressure sensor for measuring a flow rate and for producing a pressure signal corresponding to the flow rate through the liquid product pump;

wherein the pressure signal produced by the pressure sensor operates to override the vibration signal produced by the vibration sensor and cause the speed control module that actuates the first hydraulic motor to adjust the operating speed of the liquid product pump to shut down.

25. The hydraulic discharge system of claim 24, wherein at least one of the first hydraulic motor and the second hydraulic motor is a variable speed hydraulic motor.

26. The hydraulic discharge system of claim 24, wherein the selection valve comprises a valve operable to select the liquid product pump for discharging a liquid product from the tank trailer of the tank truck that does not cause cavitation within the liquid product pump.

27. The hydraulic discharge system of claim 24, wherein the selection valve comprises a valve operable to select the air compressor for discharging a liquid product from the tank trailer of the tank truck that causes cavitation within the liquid product pump.

28. The hydraulic discharge system of claim 24, wherein the vibration sensor is disposed adjacent a vacuum side of the liquid product pump and the pressure sensor is disposed adjacent a pressure side of the liquid product pump.

* * * * *